United States Patent Office 3,511,492
Patented May 12, 1970

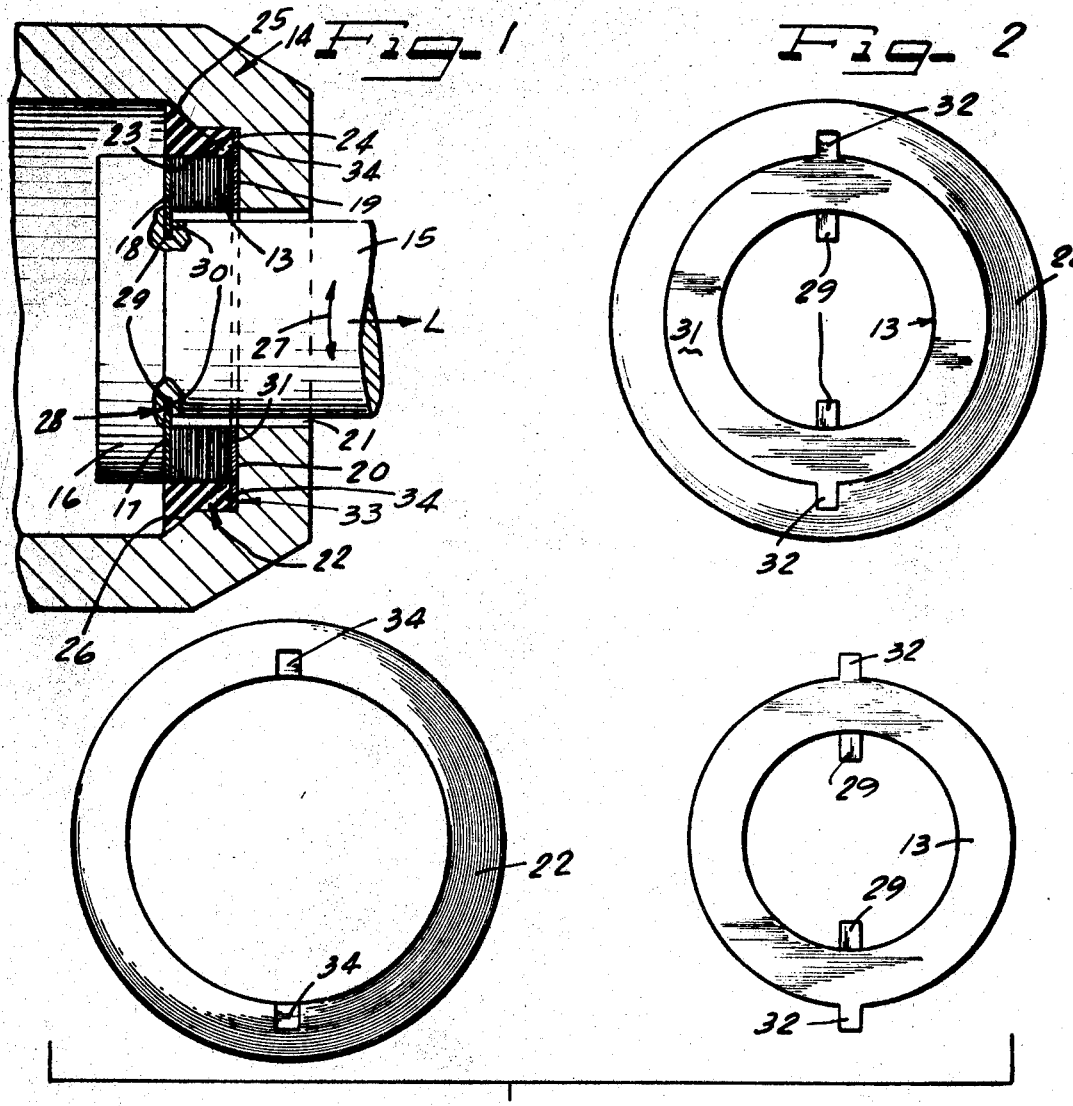
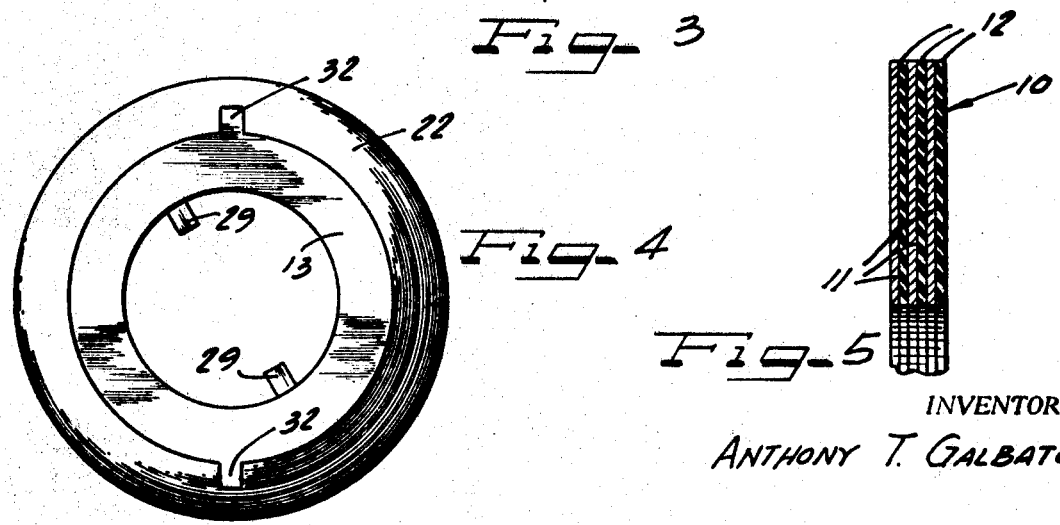

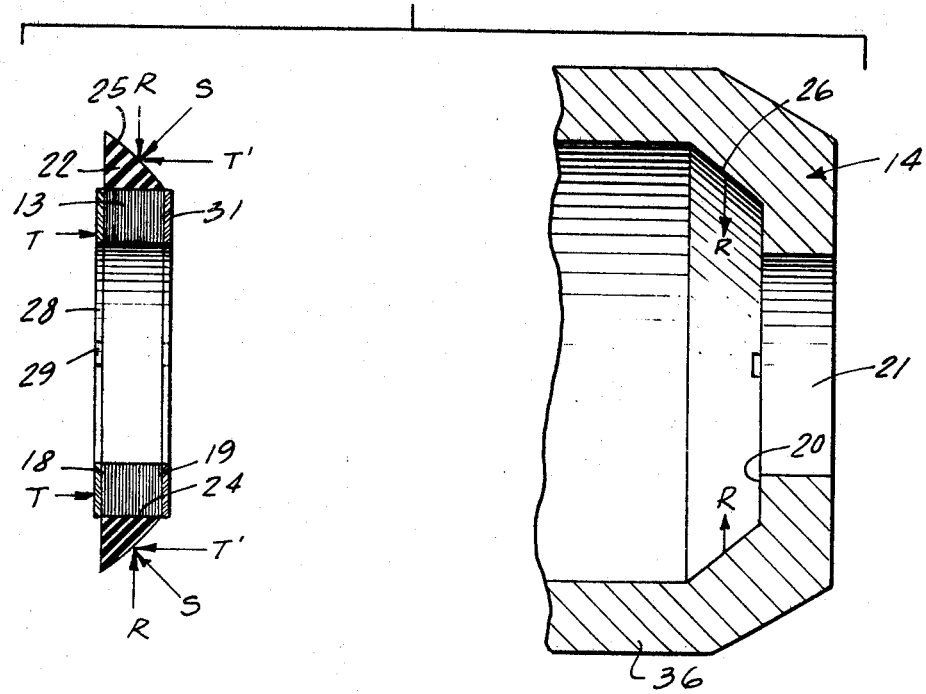
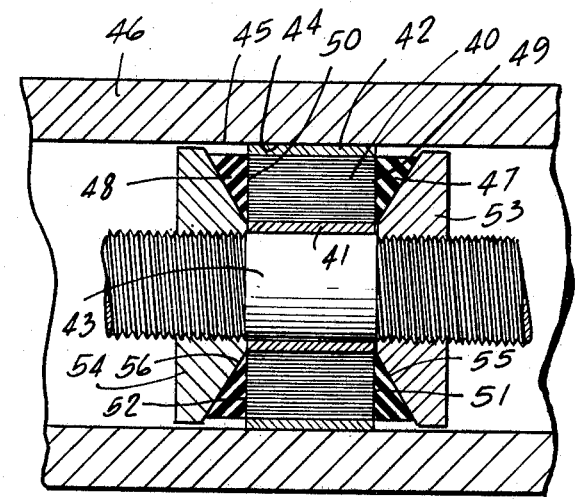

3,511,492
FLEXIBLE LAMINATED BEARING STABILIZED AGAINST BUCKLING
Anthony T. Galbato, Jamestown, N.Y., assignor to TRW, Inc., Cleveland, Ohio, a corporation of Ohio
Filed Aug. 17, 1967, Ser. No. 661,461
Int. Cl. F16c 27/00, 31/00; F16f 7/00
U.S. Cl. 267—1
9 Claims

ABSTRACT OF THE DISCLOSURE

A flexible laminated bearing stabilized by an elastomer collar or sleeve surrounding the bearing and bonded to it. The collar abuts the bearing on its radially inner side and abuts a housing receiving the bearing on its radially outer side. The radially outer side of the collar is curved and the housing is frusto-conically tapered. The collar absorbs relative movement between the bearing and the housing by shear elasticity while imparting radial stability to the bearing to prevent it from buckling when subjected to axial loads.

BACKGROUND OF THE INVENTION

Field of the invention

The invention relates to laminated bearings and more particularly to a radially stabilized laminated bearing having an elastomer collar surrounding it.

Prior art

Laminated bearings comprising alternated layers of metal and elastomer bonded together are known to the art. See, for example, the patent to Hinks No. 2,900,182. However, when such bearings are built up into high stacks there exists a tendency for the stack to buckle under load. Various attempts have been made to solve the problems presented by this buckling. See, for example, the patent to Hinks No. 3,228,673. Some prior art attempts to control buckling have not been successful inasmuch as they imposed a hard surface between a member of a bearing stack and the fixed or moveable bearing mounting members. This solution has many undesirable features, among which is the fact that as the load on the bearing rotates and the layers of the bearing stack rotate, wear is generated either at the interface between the device used to prevent buckling and the individual layers of the bearing or between the device and the fixed or moveable bearing mounting members. Such wear is undesirable in a bearing and may generate heat sufficient to cause bearing failure. Those prior art attempts to restrain buckling which incorporated the use of elastomeric material around the bearing stack required deformation of some of the metal layers of the bearing stack and/or required embedding metal pins or strips in the elastomer. These proposed solutions are expensive to manufacture and greatly increase the difficulty of assembling the bearing.

SUMMARY OF THE INVENTION

The bearing of this invention is particularly useful in helicopter rotor to hub connections. The centrifugal force of the rotating blade provides an axial load on the bearing stack which should maintain its same height regardless of the load. However, the pitch of the rotor blade must be changed during flight. For this reason a laminated bearing which is capable of absorbing relevant movement between two surfaces through the shear elasticity of the elastomer layers is particularly adaptable to such situations. This invention povides an elastomer collar to surround the laminated bearing which snugly engages the bearing on its inner diameter and the housing on its outer diameter. The collar restrains the buckling tendency of the bearing stack which is caused by the load applied to the stack by the centrifugal force of the spinning rotor and hub. At the same time, due to the shear elasticity of the elastomer collar it absorbs the twisting of the individual laminae of the bearing without allowing a relative motion, either between the bearing and the collar or the collar and the housing.

The radially outer surface of the collar is arcuately tapered with the wide end or base of the collar at the end of the bearing stack which is subject to maximum torsional displacement so that more elastomer is present at that end to absorb the displacement. The portion of the housing which contacts the radially outer surface of the collar is frusto-conically tapered. The difference between the arcuate taper of the collar and the frusto-conical taper of the housing will squeeze the collar in its center section when the assembly is subjected to thrust load thus providing a radially inner directed force to prevent the bearing stack from buckling.

Although the invention will be hereinafter described in connection with a preferred embodiment having arcuately tapered collar or collars engaged by a frusto-conically tapered surface, the invention contemplates the use of different configurations wherein the shape of the collar is different from the shape of the engaging surface so as to produce a squeezing of the collar in order to provide a directed force preventing buckling of the bearing stack.

As a further improvement, the collar of this invention may be bonded to the bearing to provide an uninterrupted plane between the elastomeric layers of the bearing and the collar. In such a bonded embodiment there is, of course, no interface between the bearing and the collar.

It is then an object of this invention to provide a radially stabilized laminated bearing which will not buckle when subjected to thrust loads and which can absorb relative rotation without rubbing movement between the bearing and the housing.

It is a further and more specific object of this invention to provide a radially stabilized laminated bearing having an elastomer collar between it and the housing in which the bearing operates, which collar is tapered to permit the relative twisting moment of the laminae of the bearing without allowing rubbing movement between the collar and the housing or the collar and the bearing.

It is yet a further and more specific object of this invention to provide a radially stabilized laminated bearing having an elastomer collar between it and the housing in which the bearing operates, which collar is arcuately tapered on its radially outer surface with its wide end adjacent the end of the bearing stack which is subject to maximum torsional displacement and which abuts a frusto-conical surface of the housing to provide stability against buckling of the bearing stack while permitting the relative twisting moment of the laminae of the bearing without allowing rubbing movement between the collar and the housing or the collar and the bearing.

Other objects and features of this invention will more fully become apparent in view of the following detailed description taken in conjunction with the accompanying drawing illustrating therein a single embodiment and in which:

FIG. 1 is a cross sectional view of the bearing and collar of this invention contained in a housing;

FIG. 2 is a top plan view of the bearing and collar of this invention assembled together;

FIG. 3 is a top plan view of the bearing and collar of this invention separate;

FIG. 4 is a top plan view of the bearing of this invention illustrating relative rotation between the top and bottom rings of the bearing; and FIG. 5 is a cross sectional view of a laminated bearing of the type used in this invention showing the alternating layers of bearing material and elastomer;

FIG. 6 is a cross sectional view of the bearing collar, and housing of this invention similar to and 90 degrees from the plane of FIG. 1 but with the bearing and collar removed from the housing;

FIG. 7 is a cross sectional view of another embodiment of this invention illustrating a radially loaded stabilized bearing.

DESCRIPTION OF THE PREFERRED EMBODIMENT

Laminated bearings are comprised of alternate layers of bearing material such as metal, plastic, and the like, and elastomer such as synthetic or natural rubber bonded together in stacks. As many layers can be bonded together as is desirable for the particular embodiment in which the bearing is to be used. The elastomer layers are thin and because of this the bearing is capable of standing up under relatively high axial loads without axial compression. Due to the shear elasticity of the elastomer layers the bearing is able to absorb relative motion between the surfaces mating with the bearing at opposite ends thereof. FIG. 5 shows an enlarged cross section of a laminated bearing 10 comprised of alternate layers of bearing material 11 and and elastomer 12. The layers 11 and 12 are bonded together.

Laminated bearings such as those illustrated by the bearing 10 when built up into relatively high stacks have a tendency to buckle when subjected to large axial thrust loads. FIG. 1 illustrates a laminated bearing stack 13 contained in a housing 14. The bearing 13 surrounds a shaft 15. The shaft has a head 16 at one end thereof with shoulder 17 which bear against one end 18 of the bearing stack 13. The other end 19 of the bearing stack 13 bears against the front wall 20 of the housing 14. The front wall 20 of the housing 14 has an aperture 21 therethrough which receives the shaft 15. A thrust load acting in the direction of the arrow L forces the shoulder 17 of the head 16 of the shaft 15 against the end 18 of the bearing stack 13. The load is such as might be caused by centrifugal force of a spinning helicopter rotor blade attached to the end of the shaft 15. As the load L increases the bearing stack 13 would have a tendency to buckle either in towards or out from the shaft 15. The shaft 15 will prevent the bearing from buckling inwardly. In order to prevent the bearing from buckling outwardly from the shaft a collar 22 surrounds the bearing stack 13. The inner diameter 23 of the collar mates with the outer diameter 24 of the bearing stack. The outer diameter 25 of the collar mates with an inner diameter bearing face 26 of the housing 14. The collar 22 prevents the bearing stack 13 from buckling outwardly from the shaft 15.

In operation the shaft 15 may rotate to a relatively small degree in the direction of the arrows 27. A tongued ring 28 is bonded to the end 18 of the bearing stack 13. The tongued ring 28 may be thicker than the individual bearing material laminae 11 of the bearing stack 13 and has integral tongues 29 which extend radially inward from the inner diameter of the ring 28. Slots 30 in the shaft 15 receive the tongues 29. A second ring 31 has tongues 32 extending radially outward from the ring 31. Tongue receiving slots or grooves 33 are formed in the housing 14 at the front wall 20 to receive the tongues 32. Thus, it can be seen that as the shaft 15 rotates in the direction of the arrows 27 rotation is imparted to the bearing stack 13 at the end 18 by the action of the head 16 of the shaft 15 against the ring 28 and by the corresponding action of the side walls of the slots 30 against the tongues 29 received therein, while the end 19 is prevented from rotating by the front wall 20 of the housing 14 and the restriction created by the tongues 32 of the ring 31 which are received in the non-rotating tongue receiving slots or grooves 33. The difference in angular rotational movement between the ring 28 and the ring 31 is absorbed by the shear elasticity of the elastomer layers 12 of the bearing stack 13.

The collar 22 is comprised of an elastomer such as natural or synthetic rubber and is bonded around its inner diameter 23 to the outer diameter 24 of the bearing stack 13. Due to the shear elasticity of the elastomer of the collar 22 it is able to absorb the angular rotation of the various layers of the bearing stack 13 without any relative movement between the inner diameter bearing face 26 of the housing 14 and the outer diameter 25 of the collar 22. Also due to the shear elasticity of the elastomer of the collar 22 it is able to at the same time absorb the relevant angular rotational movement between the ring 28 and the ring 31. The collar 22 surrounds the bearing stack 13 and effectively radially stabilizes it, thereby preventing it from buckling under axial loads. The collar 22 is dimensioned to snugly fit between the stack 13 and the housing 14. Therefore, the stack 13 cannot buckle outwardly from the shaft 15 without compressing the collar 22. The hardness of the elastomeric material of which the collar 22 is constructed should be chosen with a view towards gaining the greatest degree of incompressibility commensurate with the required degree of elasticity necessary to absorb the torsional rotation of the bearing stack.

FIG. 2 shows the combination of the bearing stack 13 and the collar 22 bonded together as they would appear prior to being incorporated in the housing.

FIG. 3 shows the bearing stack 13 and the collar 22 prior to their being bonded together. The outside surface of collar 22 is tapered with the exception of two ears 34 which are dimensioned to fit in the tongue receiving grooves 33 of the housing 14 and which when assembled mate with the tongues 32 of the ring 31. The collar 22 is tapered with its greatest radial dimension at the end which surrounds the ring 28. Because the ring 28 rotates with the shaft 15 while the ring 31 does not rotate, the greatest amount of torsional rotation which must be absorbed by the collar 22 occurs at the end of the bearing stack 13 to which the ring 28 is bonded. The housing 14 is tapered to the same degree as the collar 22. The housing 14 is tapered radially outwardly from the front wall 20. It is of course to be understood that when the bearing and collar of this invention are utilized in housing embodiments different from the described above the collar 22 may be produced in different configurations.

FIG. 4 illustrates the relative rotation of the rings 28 and 31 created by the rotation of the shaft 15. As shown in FIG. 3, the bearing stack 13 may be produced with the tongues 29 extending radially inward at the same point that the tongues 32 extend radially outward from the stack 13. In such an embodiment, when the shaft 15 is rotated the tongues 29 will be rotated through an arc such that they no longer extend radially inward from the same point that the tongues 32 extend radially outward from the bearing stack 13.

Because of the compressibility of the elastomer of the collar 22, it is desirable to arcuately taper the outer diameter 25 of the collar. FIG. 6 illustrates this taper. The collar 22 is thickest at the end 18 of the bearing stack 13 which undergoes maximum torsional displacement and is arcuately tapered to decrease in thickness toward the end 19 which undergoes minimum torsional displacement. The arcuate taper produces a non-frusto-conical outer diameter 25.

The inner diameter bearing face 26 of the housing is frusto-conically tapered from the front wall 20 of the housing 14 to the side wall 36 of the housing 14. The effect of a thrust load produced by the load L of FIG. 1 acting on the head 16 which forces the head 16 against the ring 28 is to provide a radial stabilizing force acting against the center section of the bearing stack 16. This stabilizing force is created by compression of the center section of the collar as its arcuately curved surface is forced into confirmity with the frusto-conical taper of the housing. Because the bearing stack 16 buckles by bowing out at its center a stabilizing force is most effective if it is strongest against the center of the stack. The confirmation of an arcuately tapered collar and a frusto-conically tapered housing provides such a stabilizing force.

As diagrammatically illustrated in FIG. 6 the thrust load T acting against the ring 28 will force the outer diameter 25 of the collar against the inner diameter bearing face 26 of the housing 14. Because the outer diameter 25 of the collar is arcuately tapered while the inner diameter bearing face 26 of the housing is frusto-conically tapered a radial compression force R acts against the bowed out center section of the collar 22. This compression force R compresses the outer diameter 25 of the collar 22 into conformity with the frusto-conically tapered inner diameter bearing face 26 of the housing 14. The force indicated by T is the reaction force generated by the thrust load T acting against the bearing stack. The combination of the compression force R and the reaction force T produces a stabilizing force S which acts against the outer diameter 25 of the collar 22. This force S is transmitted by the collar 22 and acts against the outer diameter 24 of the bearing stack 13 at its center. The force S prevents the bearing stack 13 from buckling outward. Although the principle of this invention has been previously described as applying to an axial thrust bearing it is equally applicable to other bearing situations. FIG. 7 illustrates the use of this invention in a radial bearing. The bearing stack 40 consists of concentric alternating layers of bonded together bearing material and elastomer. On its radially inner side the bearing stack 40 has a relatively thick central ring 41 and on its radially outer side a relatively thick circumferential ring 42. The rings 41 and 42 are bonded to the bearing stack 40. The ring 41 surrounds and engages a circular shaft 43. The shaft 43 is fixed and non-rotatable.

The circumferential ring 42 engages on its outer surface 44 the inner surface 45 of a housing 46. The housing 46 oscillates relative to the shaft 43. The bearing stack 40, due to the shear elasticity of the elastomer layers accommodates the oscillation of the housing 46 and allows the circumferential ring 42 to move relative to the center ring 41 which remains in fixed position attached to the non-oscillating shaft 43. The rings 41 and 42 may be bonded or otherwise attached respectively to the shaft and the housing.

In order to prevent the bearing stack 40 from buckling, elastomeric collars 47 and 48 brace the sides 49 and 50 of the bearing stack 40. The collars 47 and 48 are designed similar to the collar 22 previously described. The collars 47 and 48 are tapered rings and are thinnest at their inner diameter and thickest at their outer diameter with a straight radial wall and an arcuate wall. The straight radial walls 51 of the collar 47 and 52 of the collar 48 abut the sides 49 and 50 of the bearing stack 40. The outer diameter of the collars terminate at the circumferential ring 52. The collars may be bonded to the bearing stack 40. Tapered discs 53 and 54 are threaded on to the shaft 43. The frusto-conically tapered faces 55 and 56 of the discs 53 and 54 abut the arcuately shaped walls of the collars 47 and 48. The frusto-conical taper of the discs 53 and 54 act against the arcuate sides of the collars 47 and 48 in the same manner as the frusto-conically shaped face 26 of the housing 14 of previous embodiments acts against the arcuate collar 22. This action provides a stabilizing force to prevent the bearing 40 from buckling.

In the embodiment shown in FIG. 7 the housing oscillates and the shaft is fixed. If, however, the housing is fixed and the shaft oscillates the tapers of the discs and collars would be reversed. That is the collars would taper with their narrowest points on the outer diameter and their thickest points on the inner diameter. The discs 53 and 54 would have a similarly reversed taper. This would provide the most elastomer at the area of the stack having the most torsional displacement.

It is, therefore, to be understood from the above that this invention provides a radially stabilized laminated bearing which is surrounded by a tapered elastomeric collar capable of absorbing the torsional rotation of the various bearing layers without rubbing movement between the collar and the housing.

Although minor modifications might be suggested by those versed in the art, it should be understood that I wish to embody within the scope of the patent warranted hereon, all such modifications as reasonably and properly come within the scope of my contribution to the art.

I claim as my invention:

1. In a laminated columnar bearing stack comprising alternate layers of bearing material and elastomer bonded together and having an aperture therethrough, the said stack received in a housing having an apertured end wall abutting one end of the stack and a shaft received through the end wall aperture and the bearing stack aperture having a head thereon abutting the other end of the stack, the improvement of:
    end rings mounted at either end of the said stack,
    an elastomeric collar radially surrounding the stack and bonded thereto, the elastomer of the collar being integral with the elastomer layers of the stack,
    said collar having an axial length sufficient to surround substantially the entire axial length of the said stack from one end ring to the other,
    said collar dimensioned to fit between a portion of the said housing radially outward from the stack and the stack and effective to prevent columnar buckling of the stack when subjected to thrust loads imparted by the bearing stack by the said head while accommodating relative angular rotational movement between the ends of the said stack without relative movement at the interface of the collar and the said portion of the housing,
    said collar having a tapering outer diameter mating with a tapering face on the said portion of the said housing and the said collar having a radial thickness varying in accordance with the taper, the thickness being greatest adjacent the end of the stack subject to the greatest degree of angular displacement during operation of the device in which the stack is received.

2. The bearing stack of claim 1 wherein the collar is arcuately tapered to increase in radial thickness along the length of the bearing stack with the thickest portion thereof adjacent the end of the bearing stack abutted by the head of the shaft, and
    the said portion of the housing frusto-conically tapered to compress a center portion of the collar to provide a stabilizing force acting against the bearing stack with the application of the force acting intermediate the ends of the stack to prevent buckling of the said stack.

3. A helicopter blade radially stabilized laminated bearing for use between the rotor blade and blade hub including a stack of alternate layers of bearing material and elastomer bonded together receiving an end of the rotor blade therethrough and the hub therearound,
    a collar dimensioned to fit between said stack and said hub bonded to the stack and snugly seated in the hub,
    said collar effective to radially stabilized said layers to prevent buckling of the said layers when subjected to axial thrust loads,
    said collar being elastomeric and effective to absorb by the shear elasticity thereof relative torsional movement between the said layers without relative movement at an interface between the collar and the hub, and
    said collar being tapered to increase in radial thickness along the length of the stack with the thickest portion aligned with the end of the stack subject to the greatest torsional displacement, said taper being arcuate whereby the outer diameter tapered faces is slightly convex and the said hub has a tapered face seating the said collar, the said tapered face of the said hub being linearly tapered whereby portions of the said collar are compressed to a greater extent than the remaining portions.

4. A bearing assembly comprising a housing having an apertured end wall with an integral shoulder adjacent the aperture having key slots therein radially communicating with the aperture, a laminated bearing comprised of a stack of alternatingly bonded together rings of bearing material and elastomer, end rings overlying the ends of the stack and bonded to the adjacent rings of the stack, one of said end rings abutting said shoulder and having radially outwardly projecting ears seated in said key slots, the other of said end rings having inwardly projecting ears, a shaft extending fully through the bearing, end rings and aperture having a head portion thereon abutting the other of said end rings and key slots receiving the ears of said other end rings, a ring of elastomeric material surrounding said bearing and bonded thereto, and said housing embracing said ring of elastomeric material to cooperate therewith for providing columnar stability to the bearing when axially loaded while accommodating torsional displacement of the housing and shaft.

5. A laminated bearing assembly having alternate layers of bonded together bearing material and elastomer comprising: a bearing stack with an aperture therethrough, at least one elastomeric collar having a varying thickness embracing said stack around an outer edge of the layers of said stack, said collar having an arcuately tapered surface generally opposite a bearing stack edge conforming surface, said bearings stack edge conforming surface embracing said stack, the thickest portion of said collar adjacent the layers of said stack encountering the greatest displacement in operation, a frusto-conically tapered surface embracing each arcuately tapered surface and said frusto-conically tapered surface, and said arcuately tapered surface tapering in the same direction whereby said frusto-conically tapered surface compresses the arcuately tapered surface into a generally frusto-conically tapered surface during operation of the assembly to stabilize the stack against buckling.

6. In a laminated bearing comprising a stack of bonded together alternating layers of thin bearing material and elastomer, the improvement of means protecting the stack against buckling in operation which comprises: a tapered elastomer collar embracing the edges of the layers and increasing in thickness toward the portion of the stack subject to most displacement in operation, a rigid backup member surrounding said collar, said backup member deforming said collar to develop a stabilizing compression force intermediate the ends of the stack to stabilize the stack against buckling while accommodating displacement of the layers of the stack without rubbing moment between the stack and collar and between collar and backup member, said backup member and said collar having differently contoured mating faces whereby portions of said collar are compressed by a force greater than other portions of said collar and said compressive force being greatest adjacent the areas of the stack where buckling is first likely to occur.

7. The improvement of claim 6 wherein the bearing is a radial bearing consisting of concentric layers of elastomer and bearing material bonded together, the collar is a ring engaging the edges of the layers and the backup member is a rigid disc compressing the collar.

8. The improvement of claim 7 wherein a separate collar is provided at both edges of the bearing and separate discs backup the collars.

9. In a laminated bearing comprising a stack of bonded together alternate layers of thin bearing material and elastomer the improvement of means protecting the stack against buckling in operation which comprises: an elastomeric collar embracing the stack around the edges of the layers and providing a sufficient thickness of elastomer to accommodate by inter-particle flow displacement of the layers of the stack in operation of the bearing, and a backup rigid member embracing the collar and shaped relative to the collar for creating a compression load on the collar at the areas of the stack subject to buckling, said backup member and said collar having differently contoured mating faces whereby the compressive load is greater adjacent the first portion of the stack than it is adjacent other portions, the said first portion being the portion of the stack where buckling would normally be greatest.

References Cited

UNITED STATES PATENTS

| | | | |
|---|---|---|---|
| 2,482,488 | 9/1949 | Julien | 267—57.1 X |
| 2,900,182 | 8/1959 | Hinks | 308—26 X |
| 3,083,065 | 3/1963 | Hinks et al. | 308—237 |
| 3,228,673 | 1/1966 | Hinks | 267—57.1 |
| 3,292,711 | 12/1966 | Peterson | 170—160.53 |
| 3,297,094 | 1/1967 | Kisovec | 170—160.53 X |

ARTHUR L. LA POINT, Primary Examiner

H. BELTRAN, Assistant Examiner

U.S. Cl. X.R.

29—148.4; 60—271; 64—11; 170—160.51; 239—265.17, 265.35; 267—57.51; 285—51, 223, 238, 263, 404; 287—85, 87; 308—2, 26, 237